(12) United States Patent
Boerio et al.

(10) Patent No.: US 6,488,992 B1
(45) Date of Patent: Dec. 3, 2002

(54) PRODUCT HAVING A THIN FILM POLYMER COATING AND METHOD OF MAKING

(75) Inventors: F. James Boerio, Cincinnati, OH (US); Alan M. Dickey, Brimfield, IL (US); R. Giles Dillingham, Cincinnati, OH (US); Kristy J. Johnson, Bellingham, MA (US); David A. Penning, Dunlap, IL (US)

(73) Assignee: University of Cincinnati, Cincinnati, OH (US)

( * ) Notice: Subject to any disclaimer, the term of this patent is extended or adjusted under 35 U.S.C. 154(b) by 0 days.

(21) Appl. No.: 09/376,200

(22) Filed: Aug. 18, 1999

(51) Int. Cl.$^7$ .................................................. B05D 1/02
(52) U.S. Cl. ..................... 427/447; 428/425.5; 428/447; 427/448; 427/452; 427/489; 427/490
(58) Field of Search ............................... 428/425.5, 447; 427/489, 490, 447, 448, 452

(56) References Cited

U.S. PATENT DOCUMENTS

| | | |
|---|---|---|
| 4,163,828 A | 8/1979 | Mahoney |
| 4,361,596 A | 11/1982 | Dukhovskoi et al. |
| 4,603,057 A | 7/1986 | Ueno et al. |
| 4,851,068 A | 7/1989 | Uyehara |
| 5,075,174 A | 12/1991 | Pyle |
| 5,272,007 A | 12/1993 | Jenkinson et al. |
| 5,456,327 A * | 10/1995 | Denton et al. .............. 175/371 |
| 5,459,202 A | 10/1995 | Martinez et al. |
| 5,461,107 A | 10/1995 | Amin et al. |
| 5,590,887 A | 1/1997 | Senda et al. |
| 5,654,084 A | 8/1997 | Egert |
| 6,060,129 A * | 5/2000 | Thomas et al. .............. 427/490 |

FOREIGN PATENT DOCUMENTS

| | | |
|---|---|---|
| JP | 58-219045 | 12/1983 |
| JP | 5-40933 | 2/1993 |
| JP | 60-158231 | 8/1995 |
| WO | WO 96/13337 | 5/1996 |
| WO | 96-13337 * | 5/1996 |

OTHER PUBLICATIONS

Patent Abstracts of Japan, Publication No. 05040933, Feb. 19, 1993, entitled *"Magnetic Disk and Production Thereof"*.

Derwent Publications Ltd., London, GB, Publication No. XP–002152775, Section Ch, Week 198612.

Derwent Publications Ltd., London, GB, Publication No. XP–002152776, Section Ch, Week 198405.

* cited by examiner

*Primary Examiner*—Margaret G. Moore

(57) ABSTRACT

Elastomeric seals, including O-rings, may have chemically resistant thin films applied by the technique of plasma polymerization to the surface of the elastomer, enhancing wear resistance and environmental resistance without changing the physical properties of the elastomer. The films may be a silane polymer applied by plasma deposition in a radio frequency/microwave dual power source reactor.

57 Claims, 4 Drawing Sheets

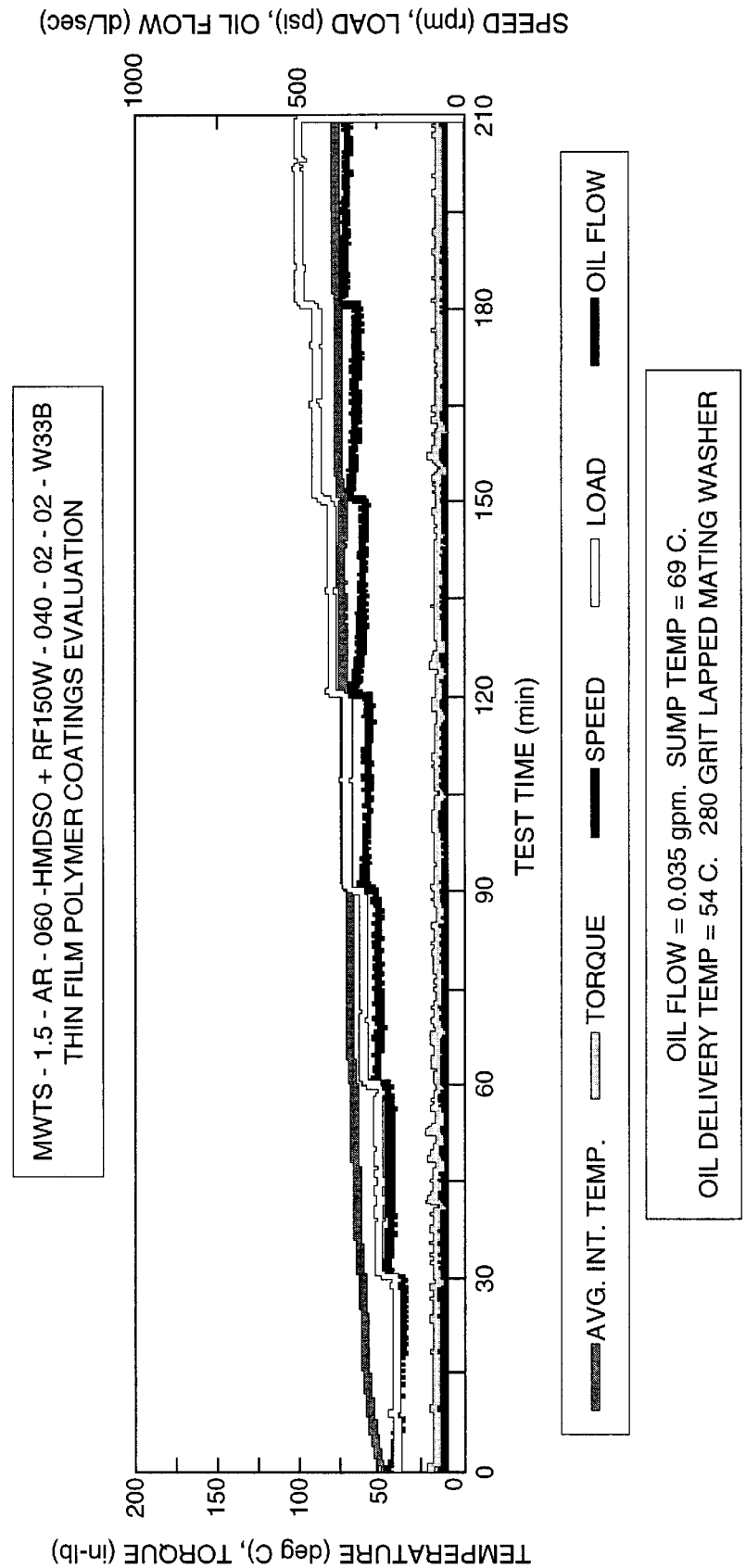

PRODUCT HAVING A THIN FILM POLYMER COATING AND METHOD OF MAKING

TECHNICAL FIELD

This invention relates generally to seals and, more particularly, to a method of applying a thin film polymer coating on an elastomeric seal for enhanced wear resistance and improved environmental resistance; and to the resulting seal.

BACKGROUND ART

Construction equipment operates in the most severe conditions imaginable, from the extreme cold of the arctic to the extreme heat of the equator. Seals used in such equipment must be effective in those conditions; plus be able to live in abrasive conditions, such as a track seal for a track-type tractor; or immersed in or exposed to hydraulic fluid, such as in a hydraulic system of a hydraulic excavator. Some seals are utilized in static applications while others are in dynamic applications. Some seals are face-type seals and others are sliding seals. Elastomeric seals are used in many of these applications and are subject to degradation in service by several mechanisms. In some cases, degradation involves abrasive wear while in others it involves oxidation or swelling in hydraulic fluids.

Elastomeric seals are used in a variety of applications, which demand resilience and resistance to high temperatures and corrosive attack. Elastomeric seals may be used in equipment, such as pumps, engines, mixers, compressors, valves, etc. When used in hydraulic systems, leaks are an anathema and superior reliability is required. In instrument applications micro-contamination is often unacceptable and seals must possess superior resistance to degradation and corrosion.

The requirements for a suitable seal are many. For example, it must not degrade or lose its elasticity in contact with the fluids being handled, even at extreme temperatures and pressures. The seal must not allow these fluids to pass through easily by permeation. Furthermore, the material must not swell appreciably in contact with the fluids being handled, even at elevated temperatures. For example, if an O-ring in contact with a moving surface swells appreciably, it may be extruded into a close-clearance area where it will be torn by friction. When an O-ring swells while in contact with a fluid under pressure or high temperature, and the pressure or temperature is then reduced, the O-ring may shrink from its extruded position in a way that causes fluid leakage to occur.

Elastomers are subject to degradation in service by several mechanisms. Most elastomeric seal failures are caused by thermal aging and fluid attack. Swelling may cause elastomeric seals to expand out of their retaining grooves, thereby causing leaks in a system. Generally, higher temperatures increase the deteriorative effect of chemicals on polymers. Thermal aging, including temperatures caused by peak loading conditions of equipment may cause elastomers to become hard and brittle, decreasing the ability of seals to conform to irregular surfaces. In addition, there is evidence that the presence of oxygen may deteriorate some elastomers subjected to temperatures greater than 200° F. In some cases, degradation of elastomers involves abrasive wear, while in others it may involve oxidation or swelling in hydraulic fluids.

It has been common practice in industry that, when various items are potentially damaged by vapors within the local environment, some form of coating is applied to reduce the potential interaction. Typically, various organic coatings are applied; one commonly utilized coating being a parylene. Other similar organics, such as polymers, are also utilized. Another form of protective coating utilized in industry is a metal or ceramix layer; typically aluminum being the metal utilized.

Although these coatings have been generally satisfactory, long-term exposure to detrimental constituents often results in damaging of the coated item. This is particularly the case when the item is relatively easily attacked by corrosion, etc. The exact nature of the penetration of the coating by the damaging constituent is not always known; however, in the case of metal coatings, the metal tends to have pinholes in the layer as a result of the deposition techniques that are utilized for its application. Similarly, diffusion and/or small pinholes often penetrate the organic layers.

We are aware of the following U.S. Pat. Nos.:

| | |
|---|---|
| 5,459,202 | 4,163,828 |
| 5,075,174 | 5,654,084 |
| 5,461,107 | 5,590,887 |
| 5,272,007 | |

DISCLOSURE OF THE INVENTION

It is a general object of the present invention to provide a product having enhanced wear resistance and/or improved environmental resistance.

Another object is to provide a seal where the elastomer has improved resistance to degradation.

A further object of the present invention is to improve the resistance of elastomers to degradation through the application of thin film polymer coatings to the elastomers by plasma polymerization or through plasma etching of the elastomers. The thin film polymer coating significantly retards the arrival of deleterious media at the surface of the elastomer and reduces their effects to an acceptable level.

A still further object is to improve the wear resistance of products.

In accordance with the present invention there is provided a product having improved resistance and comprising a substrate which may be formed from an elastomeric material or a metal and having a surface, and a thin polymer film plasma polymerized and deposited onto the substrate, thereby forming a product having improved resistance.

In accordance with another feature of the present invention there is provided a method for improving the resistance of a product comprising the steps of depositing a plasma polymerized film onto the surface of its substrate by applying an electric field to a low pressure gas, causing collisions between atoms and free electrons to form excited species, impinging the excited species upon the surface of the substrate exposed to the low pressure gas, and reacting the excited species with other excited species and with monomers to adhere a polymer film on the surface of the substrate; etching the plasma polymerized film on the surface of the substrate to improve the resistance of the film; and thereby forming a product with improved resistance.

Plasma polymerization is an efficient process that advantageously allows polymer synthesis and deposition to be combined. Furthermore, plasma polymerized films are advantageously adherent to the substrates upon which they are formed. Plasma polymerized films also advantageously have properties which can be tailored for specific applications. Moreover, a wide range of monomers can be plasma polymerized, unlike the traditional methods for polymerization, whose applicability is limited to a narrower range of monomers.

These and other objects of the invention will be apparent on review of the drawing and the Best Mode for Carrying out the Invention.

BRIEF DESCRIPTION OF THE DRAWINGS

FIG. 4 is a pressure/velocity graph from testing a coated seal; and

BEST MODE FOR CARRYING OUT THE INVENTION

Figure 1:
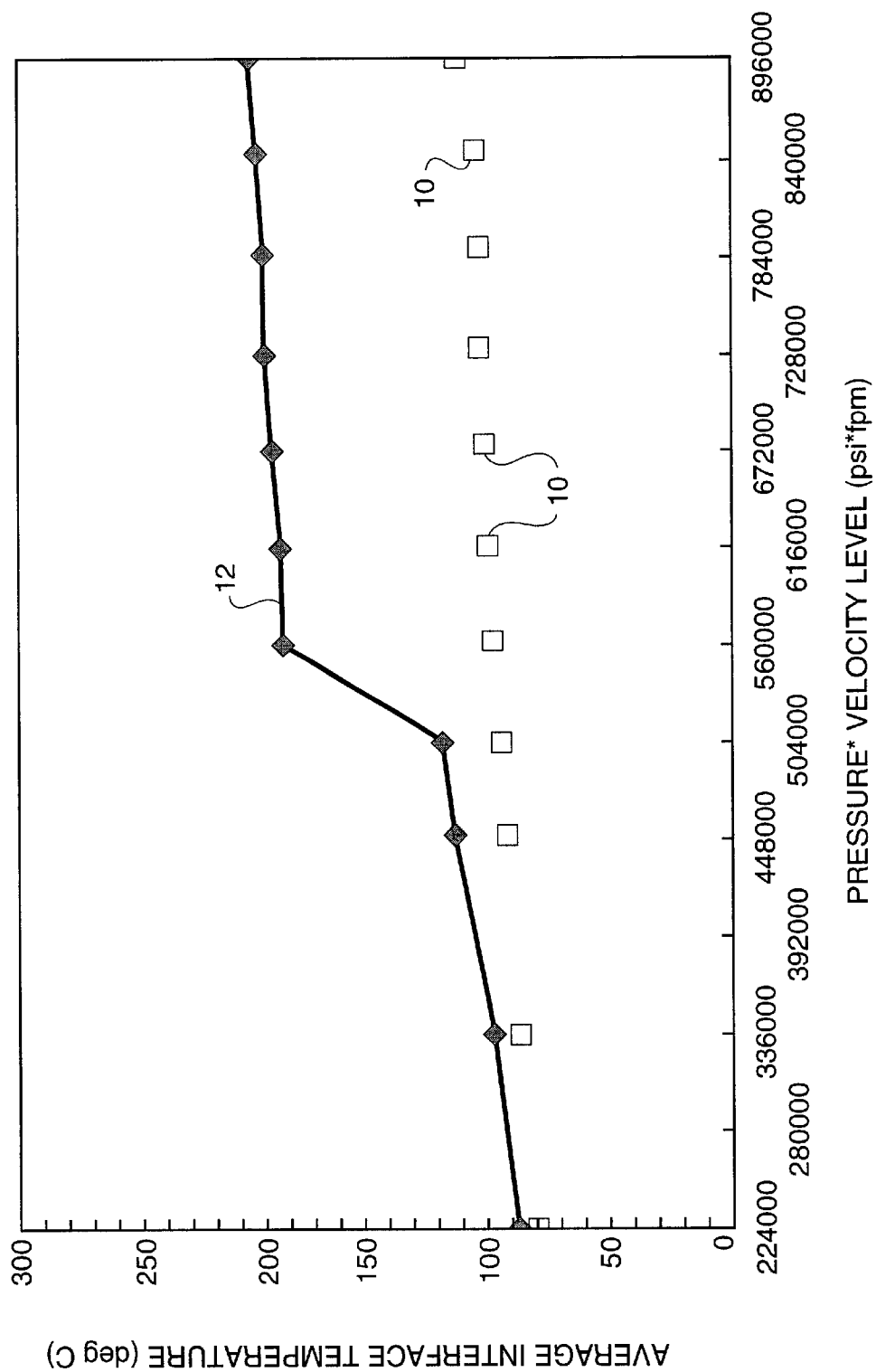
FIG. 1 is a graph comparing the tribological performance of coated and uncoated samples.

Elastomers are used as seals in a wide variety of applications. Elastomers are subject to degradation in service by several mechanisms, such as degradation caused by abrasive wear and oxidation or swelling in hydraulic fluids. The present invention relates, in part, to a method of applying a thin protective coating upon the surface of an elastomeric seal in order to prevent or reduce such degradation.

In one example, the protective coating enhances the wear resistance of elastomeric seals. This particular coating is applied via the steps of: depositing a plasma polymerized film onto a thermoplastic urethane substrate, wherein an electric field is applied to a low pressure gas, causing collisions between atoms and free electrons and the formation of excited species; the excited species are impinged upon the surface of a solid that is exposed to the low pressure gas and the excited species are reacted with other excited species and with monomers to form a polymer film; and the plasma polymerized film is etched or post-etched on the surface of the elastomeric seal to densify the film.

Advantageously, the deposition occurs in a microwave reactor, which provides good adhesion of the film to the surface of the elastomer. The microwave reactor is a relatively large airtight chamber. The reaction chamber is evacuated. The surface is then etched with an argon plasma. After the surface has been cleaned, the reactor is evacuated again and then backfilled with oxygen and a plasma is excited by admitting microwaves into the reactor through a quartz window at the top. Monomer is injected into the oxygen plasma just above the sample, which is located about 5 cm below the window. Monomer molecules and excited species, such as free radicals, impinge on the elastomer, forming a thin film having a thickness in the range of 300 Å to 3000 Å upon the surface of the elastomer. The elastomer temperature may vary during deposition within the range of 20° C. to 300° C. Hexamethyldisilazane (HMDSZ) and tetramethoxysilane (TMOS) are additional monomers that can be used to form the polymer film. The monomer is but one process variable in the deposition process.

In addition to the particular monomer used, the carrier gas used during the deposition can have a great impact on film structure. Using oxygen as the carrier gas allows the monomer to advantageously rid itself almost completely of methyl groups and form a dense, cross-linked —Si—O—Si— structure. Air also may be used as a less expensive and easier to obtain carrier gas than a pure oxygen source.

Following the deposition step in the microwave reactor, the polymer film on the substrate is etched in an oxygen plasma in a radio-frequency reactor. The etching of the polymer film may also be accomplished in an argon plasma as well. Etching in the radio-frequency reactor provides good wear resistance. The radio-frequency reactor advantageously utilizes a 13.56 MHz radio-frequency power source and is capable of producing high ion energy and therefore high etch rates.

The steps of deposition and etching may advantageously be carried out in a one-step process via use of a dual-mode source reactor that combines a radio-frequency power source with a microwave power source, enabling both frequencies of power to be used either consecutively or concurrently. The dual-mode source reactor allows great deposition flexibility without breaking vacuum.

Wear resistant films were tested by using aluminum substrates. Aluminum substrates were chosen because aluminum is known to have poor wear resistance, making it easy to determine if improvements are made by the plasma polymerized films. When the reduced average interface temperature of the coated sample (boxes 10) is compared to the uncoated sample (line 12), a drastic difference can be seen. The absence of a large rise in temperature or torque indicates that the samples did not reach a period of accelerated wear. Results from tribological testing of coatings on aluminum are illustrated by square boxes 10 in FIG. 1 which shows only an insignificant rise in temperature or torque.

Figure 3:
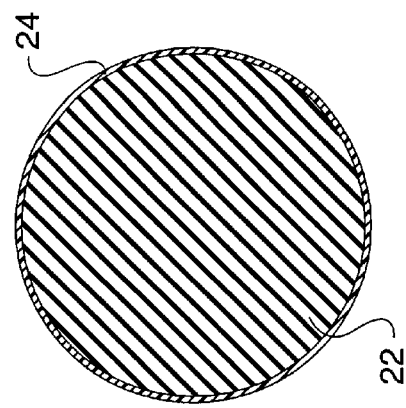
FIG. 3 is a cross-sectional view taken generally along line 3—3 of FIG. 2 and on a larger scale.
Figure 2:
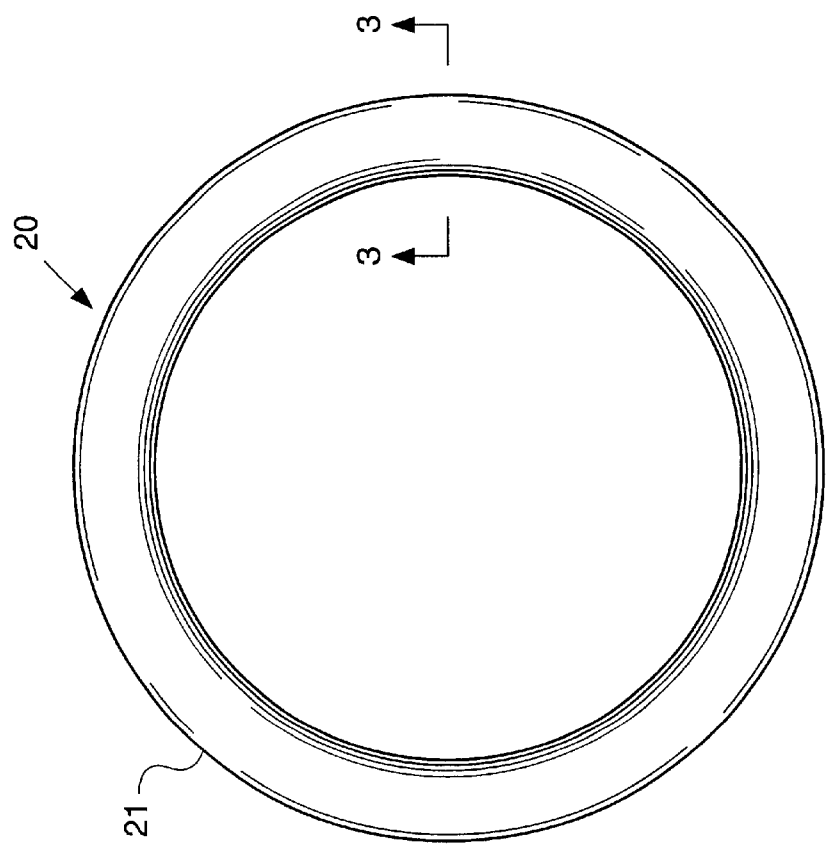
FIG. 2 is a top view of an O-ring seal with a plasma polymerized film.

FIG. 2 illustrates a seal, generally designated 20, in the form of an O-ring. The seal has a substrate 22 of polymeric material, advantageously polyurethane, and preferably a thermoplastic urethane. In some uses the outer circumferential edge 21 is the sealing edge, but this is not always the case. The cross-sectional view in FIG. 3 shows a thin film polymer coating 24 adhered to the substrate 22. The film 24 is applied by the steps described above.

Conditions for improved adhesion were discovered. Depositing films in the microwave reactor gave a significant improvement in adhesion. Altering the etch time indicated that the adhesion could be improved by going to "negative" etch times. This is achieved by having a very short etch followed by a deposition which starts out with a lower power level and continues at higher power, lower frequency conditions. It is theorized that this multi-step process maximizes both the adhesion to the substrate 22 and the mechanical properties of the film 24.

EXAMPLE 1

A track seal for the undercarriage of a track-type tractor, i.e. a dynamic seal, was coated and tested. A thermoplastic urethane substrate was etched in a microwave reactor in an argon plasma for 1.5 minutes and followed by a 120 minute HMDSO deposition in an excess of $O_2$ in the same reactor at 300 watts. It was then moved to a radio-frequency reactor where it underwent a 40 minute etch at 150 watts to densify the film. The etch gas used in this example was oxygen. The pressure/velocity trace is shown in FIG. 4. Cracks were present in the densified film, indicating that the second etch step worked to densify the film a great deal. The wear resistance of the seal was greatly improved.

Advantageously there also is provided a means for depositing thin polymer films onto the surfaces of elastomers so as to enhance the barrier properties of the elastomers. The polymer films act as barriers, significantly retarding the arrival of deleterious media at the surface of the elastomer and reducing their effects to an acceptable level. The polymer film for enhancing the barrier properties of an elastomer is deposited onto the surface of the elastomer in a microwave reactor, as described above for thin polymer films for improving wear resistance of elastomers. These films may be deposited using the monomer hexamethyldisiloxane or hexamethyldisilazane. However, the barrier properties of an elastomer may also be enhanced by use of polymer films that are mostly organic, such as polyethylene and tetrafluoroethylene.

EXAMPLES 2, 3 & 4

Figure 5:
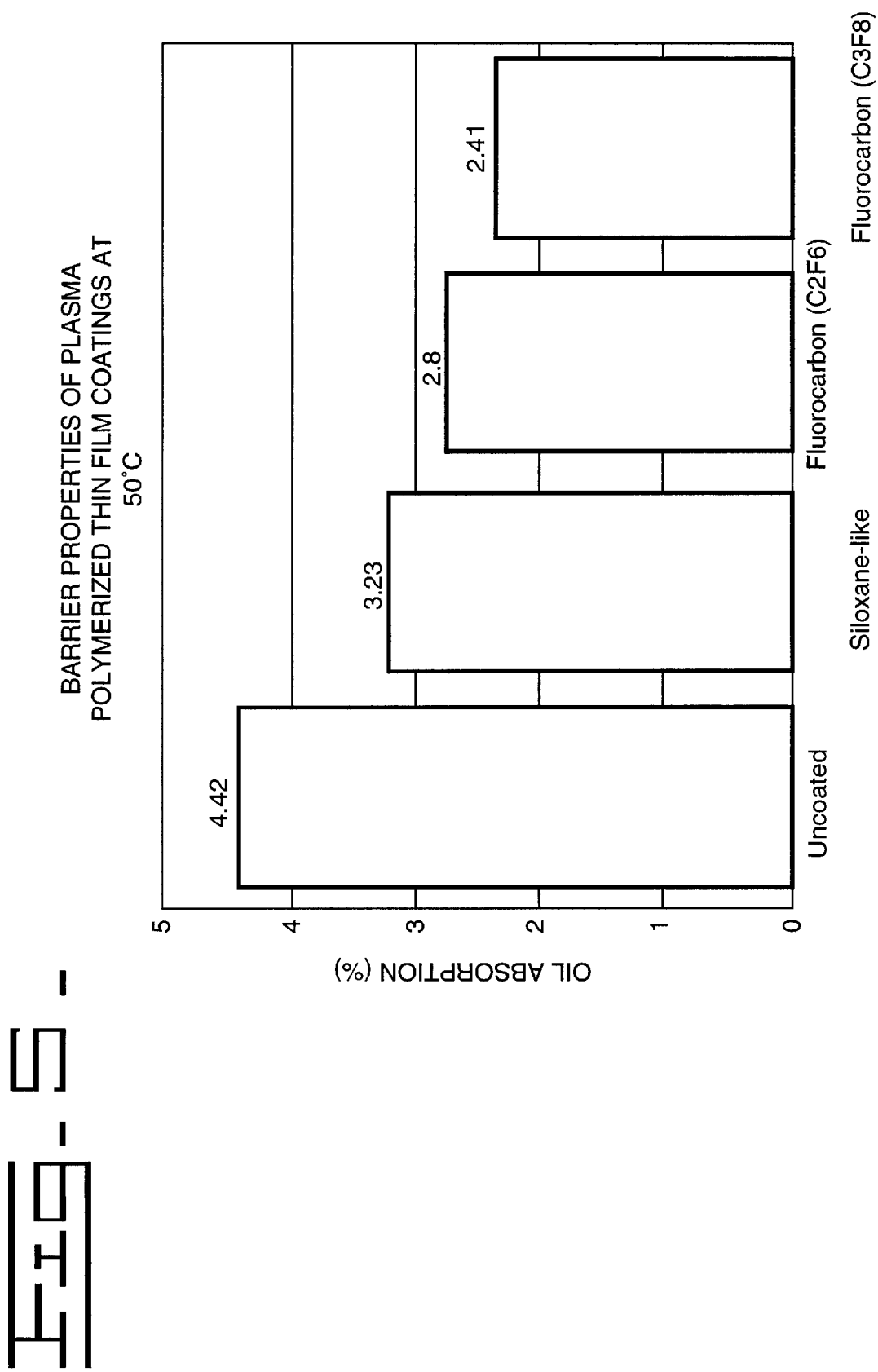
FIG. 5 is a bar chart of the oil sorption of one uncoated and three coated seals.

Three silicone O-ring seals were given thin-film coatings using the method described below. One was coated with siloxane; another with a fluorinated film produced using hexafluoroethane ($C_2F_6$) as the monomer; and yet another with a fluorinated film produced using perfluoropropane ($C_3F_8$) as the monomer. These seals and an uncoated silicone O-ring seal (i.e. a control or base-line seal) were exposed to oil for a period of twenty-two hours and the oil sorption of each was measured. FIG. 5 is a bar chart showing the results. The uncoated, base-line seal adsorbed 4.42%; the siloxane coated seal adsorbed 3.23% (i.e. a 27% improvement in oil resistance); the hexafluoroethane coated seal adsorbed 2.8% (i.e. a 37% improvement in oil resistance); and the perfluoropropane coated seal adsorbed 2.41% (i.e. a 45% improvement in oil resistance).

INDUSTRIAL APPLICABILITY

Elastomeric seals embodying the present invention may be used in a wide variety of applications in construction equipment and engines for example. Such seals used in construction equipment live in abrasive conditions, such as a track seal for a track-type tractor, or immersed in hydraulic fluid, such as in a hydraulic system of a hydraulic excavator. Other uses are contemplated where elastomeric seals having polymer coatings with improved adhesion and improved wear or environmental resistance is advantageous.

The method including the steps of the present invention may be employed in a manufacturing plant or center through the use of a microwave reactor and a radio-frequency reactor, or the use of a dual mode source plasma reactor.

The preferred method includes plasma etching and plasma polymerization. This provides a dry, gas phase process where substrates can be etched (i.e. cleaned) and then coated without breaking vacuum, making it a very clean and efficient process. Plasma etching has been identified as a process for removing mold release from the surface of thermoplastic urethane substrate. Plasma polymerized films exhibit excellent adhesion to the substrate. The preferred method also includes post deposition plasma etching (i.e. densifying) thereby forming an elastomeric seal with improved resistance. When the steps are performed in a dual mode source plasma reactor, there is greater deposition flexibility without breaking vacuum. The dual mode source plasma reactor combines a radio frequency power source with a microwave power source and enables both frequencies of power to be used either consecutively or concurrently.

Other objects, features and advantages will be apparent to those skilled in the art. While preferred embodiments of the present invention have been illustrated and described, this has been by way of illustration and the invention should not be limited except as required by the scope of the appended claims and their equivalents.

What is claimed is:

1. A method for improving the resistance of an elastomeric seal comprising the steps of:

depositing a plasma polymerized film onto the surface of an elastomeric substrate by applying an electric field to a low pressure gas, causing collisions between atoms and free electrons to form excited species, impinging the excited species upon the surface of the elastomeric substrate exposed to the low pressure gas, and reacting the excited species with other excited species and with monomers to adhere a polymer film on the surface of the elastomeric substrate; and etching the plasma polymerized film on the surface of the elastomeric substrate to densify the film;

thereby forming an elastomeric seal with improved resistance.

2. A method for improving the resistance of an elastomeric seal according to claim 1, wherein the elastomeric seal has improved wear resistance.

3. A method for improving the resistance of an elastomeric seal according to claim 1, wherein the elastomeric seal has improved environmental resistance.

4. A method for improving the resistance of an elastomeric seal according to claim 1, including operating a microwave reactor to perform said step of depositing the polymerized film onto the substrate.

5. A method for improving the resistance of an elastomeric seal according to claim 1, including operating a radio-frequency reactor to perform said step of etching the plasma polymerized film onto the substrate.

6. A method for improving the resistance of an elastomeric seal according to claim 1, including providing an oxygen plasma and etching said plasma polymerized film in the oxygen plasma.

7. A method for improving the resistance of an elastomeric seal according to claim 1, including providing an inorganic gas as said low pressure gas.

8. A method for improving the resistance of an elastomeric seal according to claim 1, wherein said low pressure gas is hexamethyldisiloxane.

9. A method for improving the resistance of an elastomeric seal according to claim 1, wherein said low pressure gas is hexamethyldisilazane.

10. A method for improving the resistance of an elastomeric seal according to claim 1, wherein said low pressure gas is tetramethoxysilane.

11. A method for improving the resistance of an elastomeric seal according to claim 1, wherein said step of depositing the polymerized film onto the substrate includes using a carrier gas for the plasma.

12. A method for improving the resistance of an elastomeric seal according to claim 11, wherein said carrier gas is oxygen.

13. A method for improving the resistance of an elastomeric seal according to claim 11, wherein said carrier gas is argon.

14. A method for improving the resistance of an elastomeric seal according to claim 11, wherein said carrier gas is air.

15. A method for improving the resistance of an elastomeric seal according to claim 1, wherein said plasma polymerized film is wear resistant to a pressure/velocity level of about 420,000 psi*fpm.

16. A method for improving the resistance of an elastomeric seal according to claim 1, wherein said plasma polymerized film has a bond to the elastomeric substrate of at least about 400 psi.

17. A method for improving the resistance of an elastomeric seal according to claim 1, including selecting a polymer which is adhesive to the elastomeric substrate.

18. A method for improving the resistance of an elastomeric seal according to claim 1, wherein said polymer coating's thickness is in the range of about 300 Å to 3000 Å.

19. A method for improving the resistance of an elastomeric seal according to claim 1, including operating a dual mode source plasma reactor to perform said steps of depositing and etching of the plasma polymerized film.

20. A method for improving the resistance of an elastomeric seal according to claim 1, wherein said low pressure gas is an organic gas.

21. A method for improving the resistance of an elastomeric seal according to claim 20, wherein said low pressure gas is an ethylene.

22. A method for improving the resistance of an elastomeric seal according to claim 20, wherein said low pressure gas is tetrafluoroethylene in a gaseous state.

23. A method for improving the resistance of an elastomeric seal according to claim 20, wherein said step of depositing the polymerized film onto the elastomeric substrate is carried out in a microwave reactor.

24. A method for improving the wear resistance of a product comprising the steps of:
   depositing a plasma polymerized film onto the surface of the product by applying an electric field to a low pressure gas, causing collisions between atoms and free electrons to form excited species, impinging the excited species upon the surface of the product exposed to the low pressure gas, and reacting the excited species with other excited species and with monomers to adhere a polymer film on the surface of the product; and
   etching the plasma polymerized film on the surface to densify the film;
   thereby forming a product with improved wear resistance.

25. An elastomeric seal having improved resistance and comprising a substrate formed from an elastomeric material and having a sealing surface, and a thin polymer film plasma polymerized and deposited onto the substrate and densified by etching, thereby forming an elastomeric seal having improved resistance.

26. An elastomeric seal according to claim 25, wherein the seal is a dynamic seal and the thin polymer film is plasma polymerized and deposited onto the sealing surface, thereby forming an elastomeric seal having improved wear resistance.

27. An elastomeric seal according to claim 26, wherein the substrate is formed from an thermoplastic urethane material, and the thin polymer film is a hexamethyldisiloxane film plasma-deposited onto the substrate.

28. An elastomeric seal according to claim 25, wherein the thin polymer film is plasma polymerized and deposited onto that portion of the substrate exposed to environment, thereby forming an elastomeric seal having improved environmental resistance.

29. An elastomeric seal according to claim 28 and having improved oil resistance, wherein the substrate is formed from silicone; said exposed portion, in use, is exposed to oil; and the thin polymer film is a thin fluorinated film plasma-deposited onto said exposed portion, thereby forming an elastomeric seal having improved environmental resistance.

30. An elastomeric seal according to claim 29 wherein the thin fluorinated film is produced using hexafluoroethane as a monomer gas.

31. An elastomeric seal according to claim 29 wherein the thin fluorinated film is produced using perfluoropropane as a monomer gas.

32. An elastomeric seal according to claim 28 and having improved oil resistance, wherein the substrate is formed from silicone; said exposed portion, in use, is exposed to oil; and the thin film is siloxane.

33. A product having improved wear resistance and comprising a substrate having a surface and a thin film plasma polymerized and deposited onto the substrate and densified, thereby forming a product having improved wear resistance.

34. A method for improving the wear resistance of a product comprising the steps of:
   depositing a plasma polymerized film onto a surface of the product by applying an electric field to a low pressure gas, causing collisions between atoms and free electrons to form excited species, impinging the excited species upon the surface of the product exposed to the low pressure gas, reacting the excited species with other excited species and with monomers to adhere a polymer film on the surface of the product, and thereafter etching the polymer film on the surface of the product at a radio frequency.

35. A method for improving the wear resistance of a product including the steps of:
   depositing a plasma polymerized film onto a surface of the product by applying an electric field to a low pressure gas, causing collisions between atoms and free electrons to form excited species, impinging the excited species upon the surface of the product exposed to the low pressure gas, reacting the excited species with other excited species and with monomers to adhere a polymer film on the surface of the product, and densifying the polymer film adhered on the surface of the product.

36. A method for improving the wear resistance of a product according to claim 34, wherein the surface is an elastomer.

37. A method for improving the wear resistance of a product according to claim 34, wherein the product is an elastomeric seal.

38. A method for improving the wear resistance of a product according to claim 34, wherein the electric field is in the form of a microwave.

39. A method for improving the wear resistance of a product according to claim 34, including the preliminary step of cleaning the surface of the product.

40. A method for improving the wear resistance of a product according to claim 38, wherein the step of cleaning the surface of the product is performed in a reactor.

41. A method for improving the wear resistance of a product according to claim 40, wherein the step of cleaning the surface of the product is performed with an inert gas.

42. A method for improving the wear resistance of a product according to claim 40, wherein the step of cleaning the surface of the product is performed by utilizing a radio frequency reactor.

43. A method for improving the wear resistance of a product according to claim 34, including operating a dual mode source plasma reactor to perform said steps of depositing and etching the plasma polymerized film.

44. A method for improving the wear resistance of a product according to claim 43, including the preliminary step of cleaning the surface of the product while in the dual mode source plasma reactor.

45. A method for improving the wear resistance of a product according to claim 44, wherein the cleaning step is performed in the reactor at a radio wave frequency, the depositing step is performed at a microwave frequency without removing the product from the reactor, and the etching step is performed without removing the product from the reactor.

46. A product having improved wear resistance according to claim 33, wherein the thin polymer film is plasma polymerized and deposited onto the surface of the product that is exposed to an environment, thereby forming a product having improved environmental resistance.

47. A product having improved wear resistance according to claim 33, wherein said plasma polymerized film is wear resistant to a pressure/velocity level of about 420,000 psi*fpm.

48. A product having improved wear resistance according to claim 33, wherein said plasma polymerized film has a bond to the surface of the product of at least about 400 psi.

49. A product having improved wear resistance according to claim 33, wherein said plasma polymerized film has a thickness is in the range of about 300 Å to 3000 Å.

50. A method for improving the wear resistance of a product according to claim 35, including operating a microwave reactor to perform said step of depositing the polymerized film onto the surface of the product.

51. A method for improving the wear resistance of a product according to claim 35, including operating a radio-frequency reactor to perform said step of densifying the polymer film adhered on the surface of the product.

52. A method for improving the wear resistance of a product according to claim 35, including providing an oxygen plasma and densifying said plasma polymerized film in the oxygen plasma.

53. A method for improving the wear resistance of a product according to claim 35, wherein said step of depositing the polymerized film onto the surface of the product includes using a carrier gas for the plasma.

54. A method for improving the wear resistance of a product according to claim 35, including operating a dual mode source plasma reactor to perform said steps of depositing and densifying the plasma polymerized film.

55. A method for improving the surface resistance of a product including the steps of:

placing a substrate into a dual-mode reactor;

depositing a plasma polymerized film onto a surface of the substrate at a microwave frequency to adhere the film onto the substrate surface;

densifying the deposited plasma polymerized film at a radio frequency and without removing the product from the dual-mode reactor to improve the resistance of the film; and thereby forming a product having improved surface resistance.

56. A method for improving the surface resistance of a product including the steps of:

placing a substrate into a dual-mode reactor;

depositing a plasma polymerized film onto a surface of the substrate at a microwave frequency to adhere the film onto the substrate surface;

etching the deposited plasma polymerized film at a radio frequency and without removing the product from the dual-mode reactor to improve the resistance of the film; and thereby forming a product having improved surface resistance.

57. A product having improved wear resistance and comprising a substrate having a surface and a thin plasma polymerized film deposited on and adhered to the substrate surface, and the deposited thin plasma polymerized film being radio frequency etched after deposition to improve wear resistance.

* * * * *